(12) United States Patent
Zuck et al.

(10) Patent No.: US 8,210,306 B2
(45) Date of Patent: Jul. 3, 2012

(54) SYSTEM AND METHOD FOR DISABLING A VEHICLE

(75) Inventors: James C. Zuck, Marshall, MI (US); Christopher Fruin, Battle Creek, MI (US); Aaron Zuck, Horner, MI (US)

(73) Assignee: Marshall Excelsior Company, Marshall, MI (US)

( * ) Notice: Subject to any disclaimer, the term of this patent is extended or adjusted under 35 U.S.C. 154(b) by 180 days.

(21) Appl. No.: 12/752,582

(22) Filed: Apr. 1, 2010

(65) Prior Publication Data

US 2010/0252352 A1 Oct. 7, 2010

Related U.S. Application Data

(60) Provisional application No. 61/166,079, filed on Apr. 2, 2009.

(51) Int. Cl.
*B65B 1/04* (2006.01)
*B65B 3/04* (2006.01)
(52) U.S. Cl. ............ 180/271; 141/207; 141/346; 141/94
(58) Field of Classification Search .................. 180/271; 141/207, 192, 94, 346
See application file for complete search history.

(56) References Cited

U.S. PATENT DOCUMENTS

| | | |
|---|---|---|
| 2,179,704 A | 11/1939 | Schjolin |
| 2,847,023 A | 8/1958 | Hansen et al. |
| 2,871,872 A | 2/1959 | Rowles |
| 3,026,004 A | 3/1962 | Rowell |
| 3,119,406 A | 1/1964 | Hartung |
| 3,172,576 A | 3/1965 | Hartung |
| 3,549,207 A | 12/1970 | Hayes |
| 3,572,305 A | 3/1971 | Moragne |
| 3,612,619 A | 10/1971 | Hayes |
| 4,024,897 A | 5/1977 | Hall |
| 4,076,326 A | 2/1978 | D'Angelo |
| 4,091,848 A | 5/1978 | Phillips |
| 4,135,596 A | 1/1979 | Silba |
| 4,442,915 A | 4/1984 | Steel |
| 4,469,149 A | 9/1984 | Walkey et al. |
| 4,583,072 A | 4/1986 | Matsushita |
| 4,753,488 A | 6/1988 | Whiteman et al. |
| 5,204,819 A | 4/1993 | Ryan |
| 5,329,164 A | 7/1994 | Saito |
| 5,359,522 A | 10/1994 | Ryan |
| 5,451,927 A | 9/1995 | Thompson |
| 5,635,770 A | 6/1997 | Evans, Jr. et al. |
| 5,700,999 A | 12/1997 | Streicher et al. |

(Continued)

FOREIGN PATENT DOCUMENTS

WO 2008017756 A2 2/2008

*Primary Examiner* — Drew Brown
(74) *Attorney, Agent, or Firm* — Howard & Howard Attorneys PLLC

(57) ABSTRACT

A system for disabling a vehicle carrying a storage tank includes a coupler component supported by the vehicle for receiving a connection from a delivery line. A cap is attachable to an end of the coupler component for preventing connection of the delivery line when the cap is attached. A proximity sensor is disposed outside of the coupler component and senses whether the cap is attached without making contact with the cap. A switch is in electrically connected to the sensor and disables at least one drive element of the vehicle, e.g., the transmission, when the cap is not attached to the coupler component.

19 Claims, 7 Drawing Sheets

U.S. PATENT DOCUMENTS

| | | | |
|---|---|---|---|
| 5,720,327 A | 2/1998 | Foster, Jr. | |
| 5,729,002 A | 3/1998 | Samples | |
| 6,011,484 A | 1/2000 | Dietl et al. | |
| 6,021,823 A | 2/2000 | Hale | |
| 6,397,791 B1 * | 6/2002 | Brister | 123/41.15 |
| 6,575,131 B2 * | 6/2003 | Brister | 123/198 D |
| 6,712,171 B2 | 3/2004 | Farmer | |
| 6,825,760 B2 | 11/2004 | Sawyer et al. | |
| 7,051,831 B2 | 5/2006 | Scholer et al. | |
| 7,171,989 B2 | 2/2007 | Corless et al. | |
| 7,195,093 B1 | 3/2007 | Ahmadi | |
| 7,322,337 B1 | 1/2008 | Brister et al. | |
| 7,322,338 B1 | 1/2008 | Brister et al. | |
| 7,378,979 B2 * | 5/2008 | Rams, Jr. | 340/667 |
| 7,412,994 B2 * | 8/2008 | Corless et al. | 141/198 |
| 7,671,482 B2 * | 3/2010 | Tighe | 307/9.1 |
| 7,806,456 B1 * | 10/2010 | Zandparsa | 296/97.22 |
| 7,841,315 B1 * | 11/2010 | Brister et al. | 123/198 D |
| 2003/0102976 A1 | 6/2003 | Lavallee | |
| 2009/0091438 A1 * | 4/2009 | Rovik | 340/457 |
| 2009/0303466 A1 * | 12/2009 | Arakawa et al. | 356/128 |
| 2010/0133024 A1 * | 6/2010 | Miwa et al. | 180/65.21 |

* cited by examiner

SYSTEM AND METHOD FOR DISABLING A VEHICLE

CROSS REFERENCE TO RELATED APPLICATION

This application claims the benefit of provisional patent application No. 61/166,079, filed Apr. 2, 2009, which is hereby incorporated by reference.

BACKGROUND OF THE INVENTION

1. Field of the Invention

The subject invention relates to a system and method for disabling a vehicle. More specifically, the subject invention relates to a system and method for disabling movement of a vehicle when a cap of a coupler component is not disposed on the coupler component.

2. Description of the Related Art

Motorized vehicles often carry storage tanks for holding a substance. The substance is typically delivered to or extracted from the storage tank via a hose. The hose is often attached to a coupling component to ensure that spillage of the substance is kept to a minimum. Unfortunately, often due to human error, the hose is left attached to the vehicle as the driver operates the vehicle. This invariably results in damage to the hose, the coupling component, or other equipment. Furthermore, spillage of the substance invariably occurs, which can have negative environmental, financial, and safety implications.

The prior art identifies some systems and methods for disabling a vehicle. Unfortunately, these systems often use moving mechanical parts to sense whether or not a hose is attached to a vehicle. These moving mechanical parts are prone to failure over time. Furthermore, implementation of these prior art systems and methods typically require specialized coupler components and/or modification of existing coupler components.

The present invention solves these and other shortcomings of the prior art.

BRIEF SUMMARY AND ADVANTAGES

The subject invention includes a system for disabling a vehicle carrying a storage tank capable of holding a substance. The system includes a coupler component supportable by the vehicle for receiving a connection from a delivery line. The coupler component including a peripheral housing having a first end and a second end. The coupler component defines an inner passage for accommodating the flow of the substance therethrough and separating the inner passage from an outer region. A cap is attachable to the first end of the coupler component for preventing connection of the delivery line when the cap is attached to the coupler component. A sensor senses whether the cap is attached to the coupler component without making contact with the cap. The system also includes a switch in communication with the sensor and connectable to at least one drive element of the vehicle to disable the at least one drive element of the vehicle when the cap is not attached to the coupler component.

The subject invention also includes a method for disabling the vehicle carrying a storage tank, where the vehicle has a coupler component with at least a first end for receiving connection to a delivery line and accommodating the flow of a substance therethrough. The method includes the step of electronically sensing whether a cap is attached to the coupler component without making contact with the cap. The method also includes the step of disabling at least one drive element of the vehicle when the cap is not attached to the coupler component.

By sensing the presence of the cap, the system and method prevent the accidental drive-off of the vehicle while the delivery line is still attached to the vehicle. Furthermore, the vehicle is prevented from moving due to accidental or malicious removal of the cap. As such, the system prevents damage to equipment as well as preventing environmentally hazardous spills in the case where the substance may be hazardous.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, a system 10 and method for disabling a vehicle V carrying a storage tank S is shown herein.

The storage tank S is utilized for holding a substance. The substance may be a flammable liquid or gas, such as, but not limited to, propane, liquefied petroleum gas, gasoline (petrol), petroleum, ethanol, methanol, diesel, hydrogen, kerosene, and jet fuel. The substance may also be a non-flammable liquid or gas, such as, but not limited to, water, compressed air, milk, and vegetable oil. Furthermore, the substance may be a solid, especially a solid in granular form, such as, but not limited to, grains. Moreover, those skilled in the art realize other substances that may be held in the storage tank S in accordance with the subject invention. In the illustrated embodiment, the substance held in the storage tank S is not used to propel the vehicle V, but is instead being merely transported by the vehicle V.

Figure 1A:
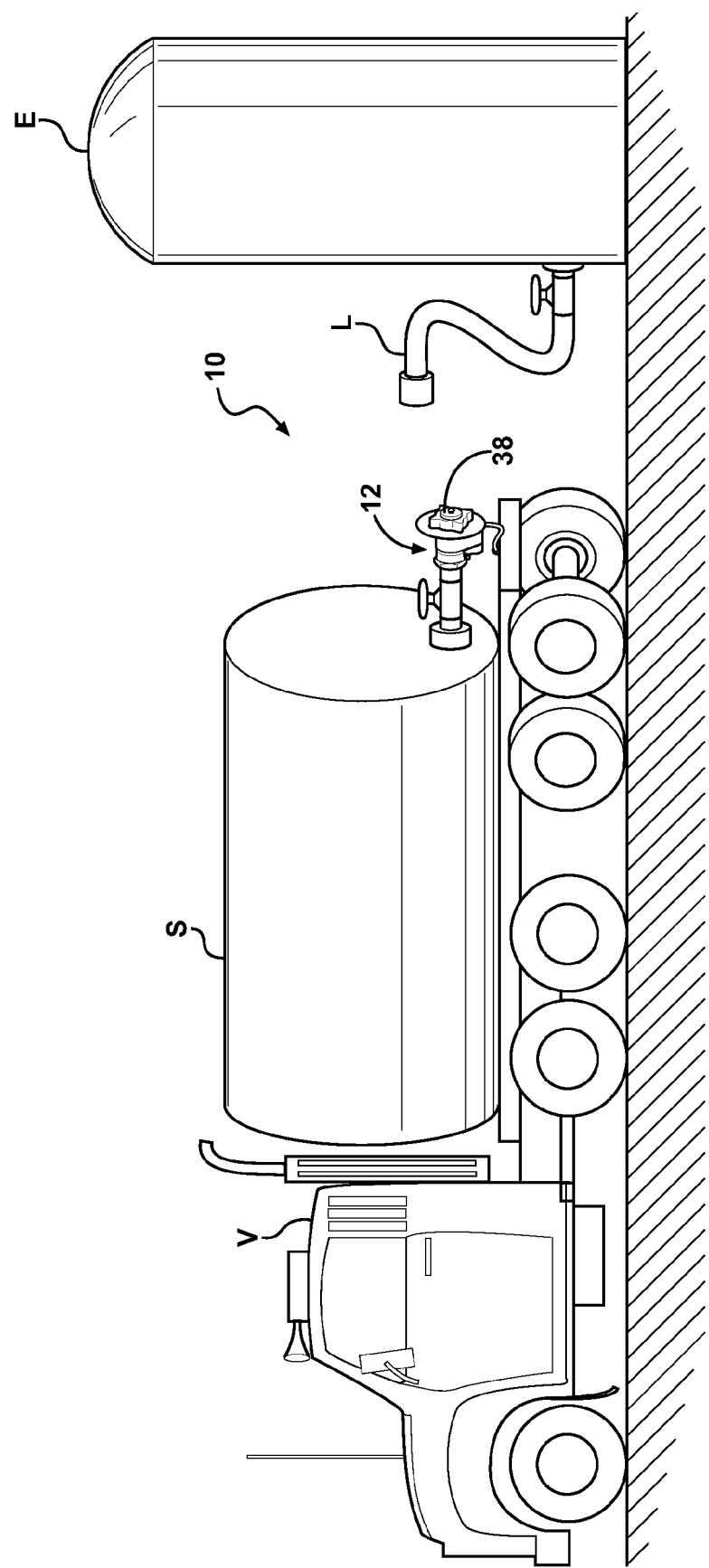
FIG. 1A is a perspective view a vehicle carrying a storage tank with a coupler component having a cap attached.
Figure 1B:
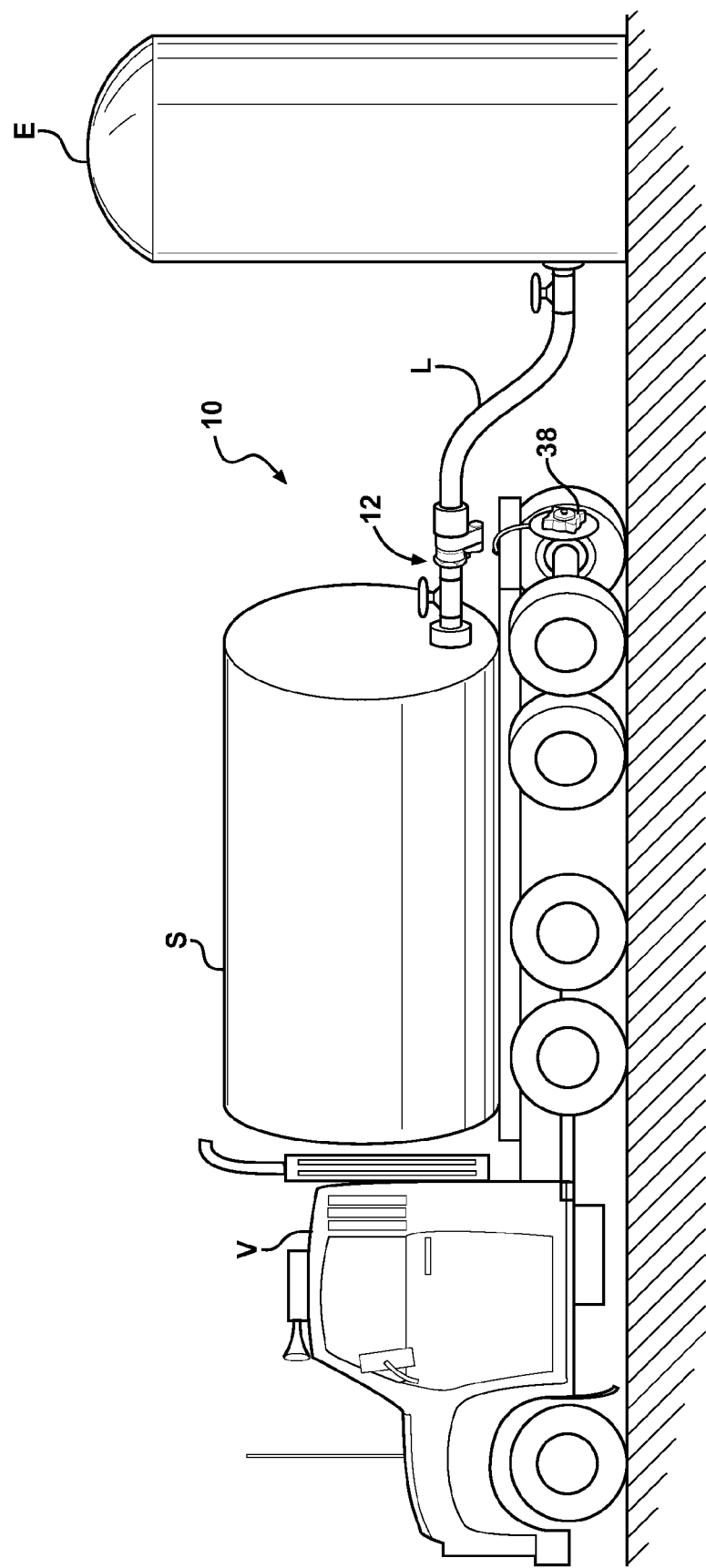
FIG. 1B is a perspective view of the vehicle with the cap removed from the coupler component and a supply line attached to the coupler component.

Referring to FIG. 1, the system 10 includes a coupler component 12 for coupling the storage tank S to an external tank E to transfer the substance therebetween. The coupler component may be implemented as the "dry break coupler" disclosed in U.S. patent application Ser. No. 12/184,752, filed on Aug. 1, 2008, which is hereby incorporated by reference. Of course, other implementations of the coupler component 12 are realized by those skilled in the art within the scope of the claimed invention.

The coupler component 12 is supportable by the vehicle V for receiving a connection from a delivery line L. The delivery line L, as shown in FIG. 1, is in fluidic communication with the external tank E. The delivery line L may be a hose or similar device. In the illustrated embodiment, the coupler component 12 is supported by, i.e., attached to, the vehicle V. The coupler component 12 may be fluidically connected to the storage tank S by one or more pipes (not numbered). However, those skilled in the art realize that the coupler component 12 may be connected directly to the storage tank S. Furthermore, one or more valves (not shown) may be disposed between the coupler component 12 and the external tank E and between the coupler component 12 and the storage tank S.

Figure 2:
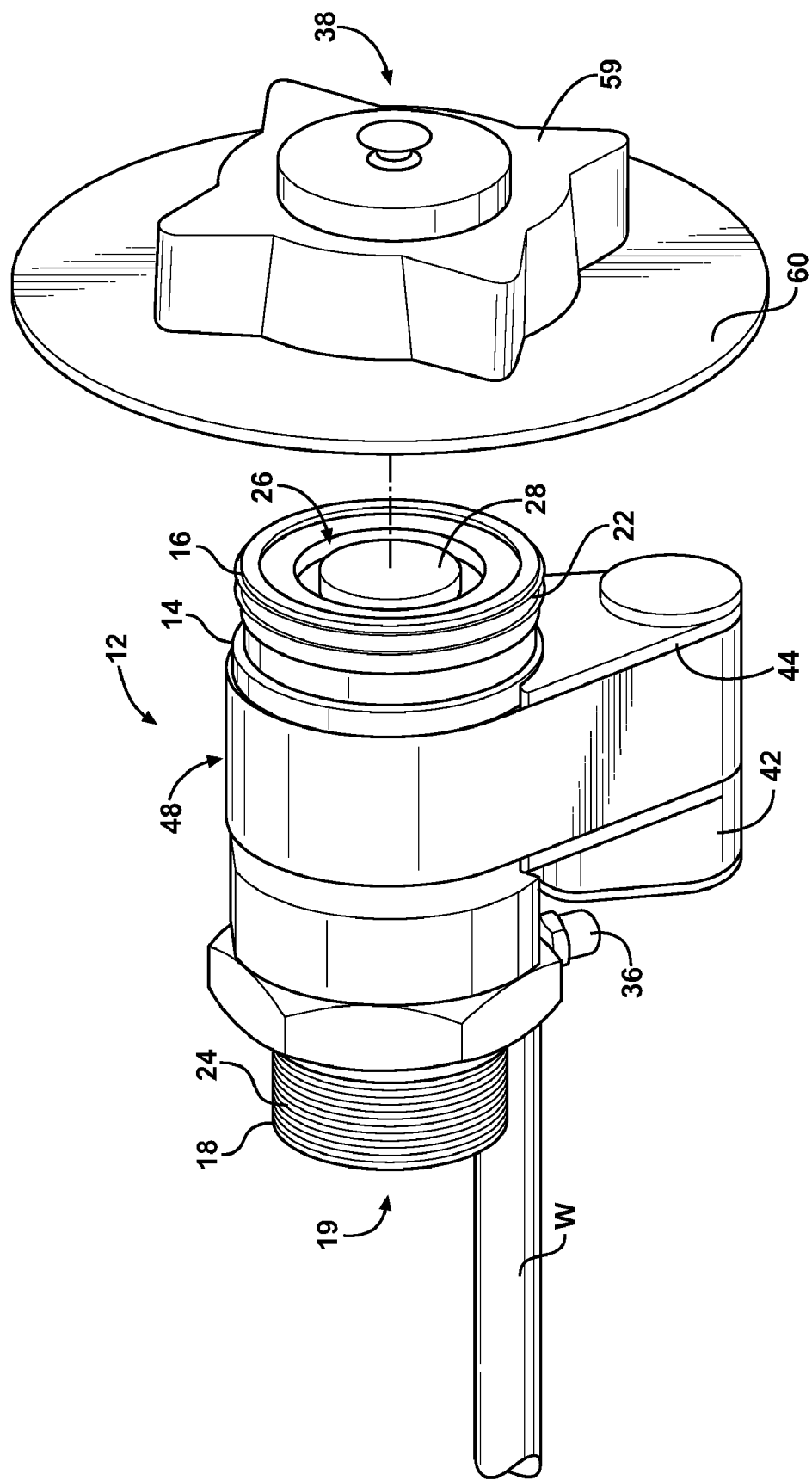
FIG. 2 is side perspective view of the coupler component with a sensor housing attached thereto and showing the cap removed from the coupler component.
Figure 3:
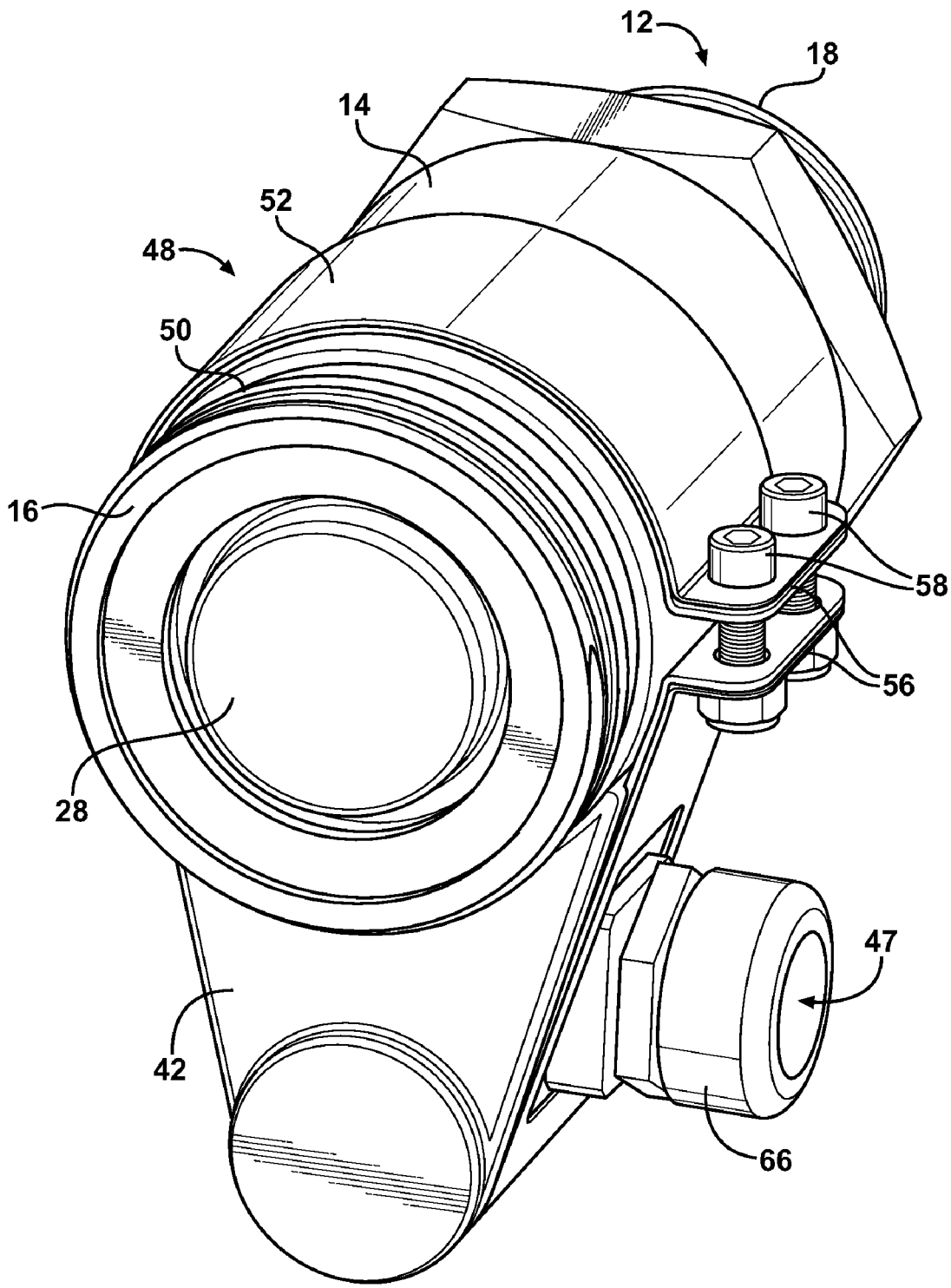
FIG. 3 is front perspective view of the coupler component showing a valve face of a valve.

Referring to FIG. 2, the coupler component 12 includes a peripheral housing 14 having a first end 16 and a second end 18. The peripheral housing 14 also defines an inner passage 19 for accommodating the flow of the substance therethrough. The peripheral housing 14 separates the inner passage 19 from an outer region 20 outside of the peripheral housing 14. The first end 16 is connectable to the delivery line L while the second end 18 is connectable to the pipes.

In the illustrated embodiment, the peripheral housing 14 has a generally cylindrical shape and is formed of a metal. An outer surface 21 of the peripheral housing 14 defines first threads 22 disposed adjacent the first end 16 for mating with the delivery line L. The outer surface of the peripheral housing 14 also defines second threads 24 disposed adjacent the second end 18 for mating with the pipes.

The illustrated embodiment of the coupler component also includes a coupler valve 26 disposed in the inner passage 18. The coupler valve 26 is moveable between an open-coupler valve position and a closed-coupler valve position. The coupler valve 26 includes a valve face 28 of a circular shape. A coupler spring 30 (see FIG. 5) continuously biases the coupler valve 26 in the closed-coupler valve position. The coupler valve 26 includes a guide rod 32. A guide mount 34 is fixed to the peripheral housing 14 and slidably receives the guide rod 32 as the coupler valve 26 moves between its open and closed positions. The coupler component 12 further includes a pressure relief valve 36 for relieving the substance in instances where the pressure inside the inner passage 19 exceeds a predefined limit.

Referring to FIGS. 1A and 2, a cap 38 is attachable to the first end 16 of the coupler component 12 for preventing connection of the delivery line L when the cap 38 is attached to the coupler component 12. In the illustrated embodiment, the cap 38 is generally circular in shape and includes internal threads (not shown) for mating with the first threads 22 of the peripheral housing 14.

Figure 5:
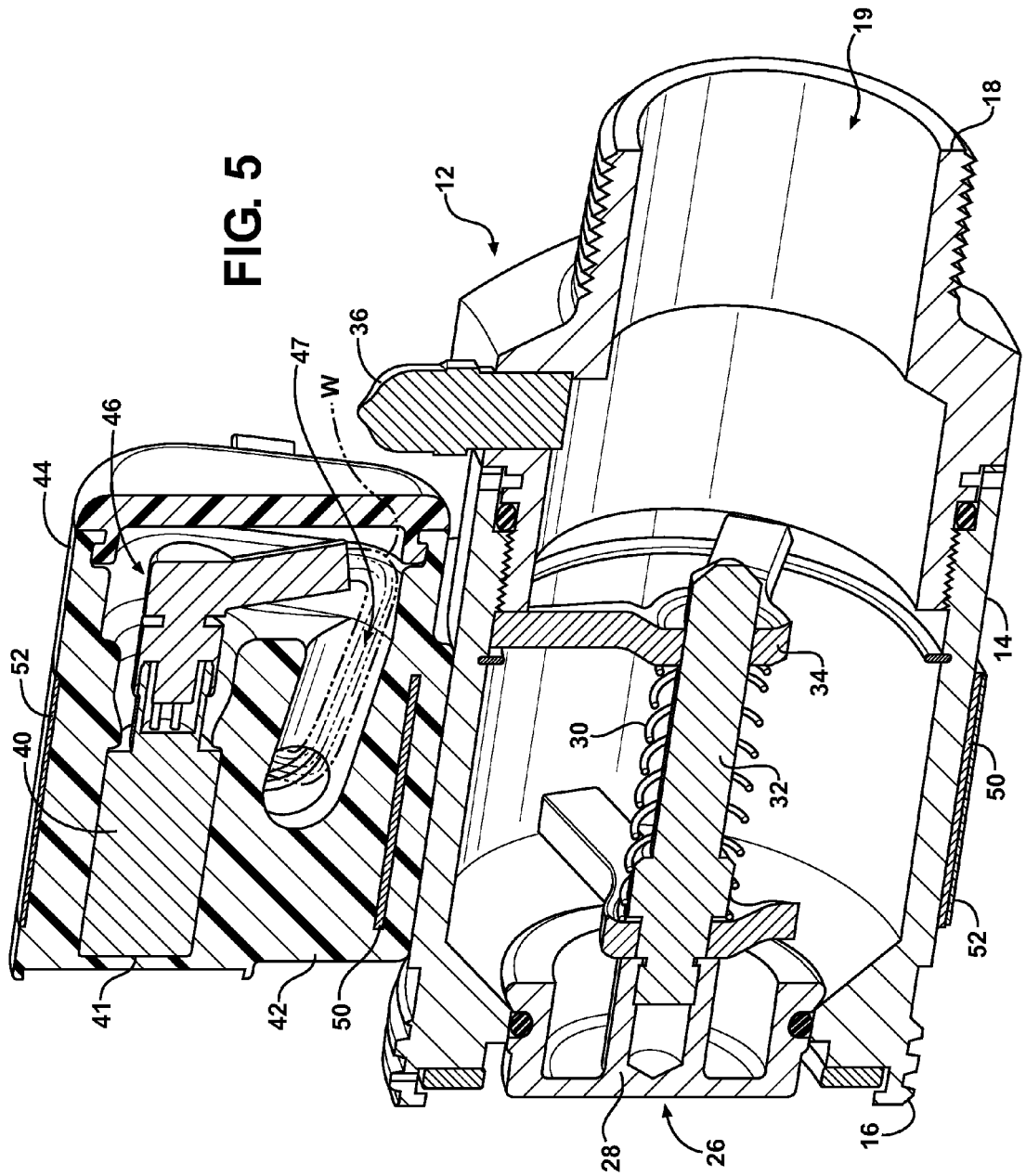
FIG. 5 is a cross sectional interior view of the coupler component and the sensor housing showing a sensor embedded within the sensor housing.

Referring specifically to FIG. 5, the system 10 includes a sensor 40 for sensing whether or not the cap 38 is attached to the coupler component 12. Furthermore, the system 10 disables at least one drive element E of the vehicle V when the cap is 38 not attached to said coupler component 12, as described in greater detail below.

In the illustrated embodiment, the sensor 40 senses whether or not the cap 38 is attached to the coupler component 12 without making contact with the cap 38. That is, no mechanical connection is made between the sensor 40 and the cap 38. Those skilled in the art realize that this type of non-contact sensor 40 is typically referred to as a proximity sensor. The sensor 40 may be implemented as any of the proximity sensors known in the art, such as, but not limited to, inductive sensors emitting an electromagnetic field, capacitive sensors emitting an electrostatic field, optical sensors emitting a beam of electromagnetic radiation, or Hall-effect sensors detecting changes in a magnetic field.

In the illustrated embodiment, the sensor 40 is implemented as an inductive proximity sensor. One suitable sensor 40 is Part No. Bi8U-M18-APEX-H1141, manufactured by Hans Turck GmbH & Co. KG headquartered in Mülheim an der Ruhr, Germany. Of course, those skilled in the art realize other suitable sensors 40 that may be implemented within the scope of the claims of the subject invention. The sensor 40 of the illustrated embodiment includes a sensor head 41 which emits the electromagnetic field.

The sensor 40 is preferably disposed in the outer region 20. That is, the sensor 40 is preferably not disposed within the inner passage 19 of the coupler component. Furthermore, the sensor 40 preferably does not penetrate the peripheral housing 14 of the coupler component 12. As such, there is no need for additional machining and sealing of the coupler component 12 in order for the sensor 40 to sense whether or not the cap 38 is attached.

The sensor 40 of the illustrated embodiment is encased within a sensor housing 42. More specifically, the sensor housing 42 includes an external surface 44 and defines an inner cavity 46 for accommodating the sensor 40. The sensor housing 42 also defines a passageway 47 coupled with the inner cavity 46. The passageway accommodates wires and/or cables (not numbered) for electrically connecting the sensor 40 to other electrical devices. The sensor housing 42 is preferably formed of a non-conductive material, such as, but not limited to, rubber or plastic. As such, the sensor housing 42 does not interfere with the inductive proximity sensor 40 of the illustrated embodiment. However, in other embodiments, the sensor housing may be formed of a conductive material, such as metal.

Figure 4:
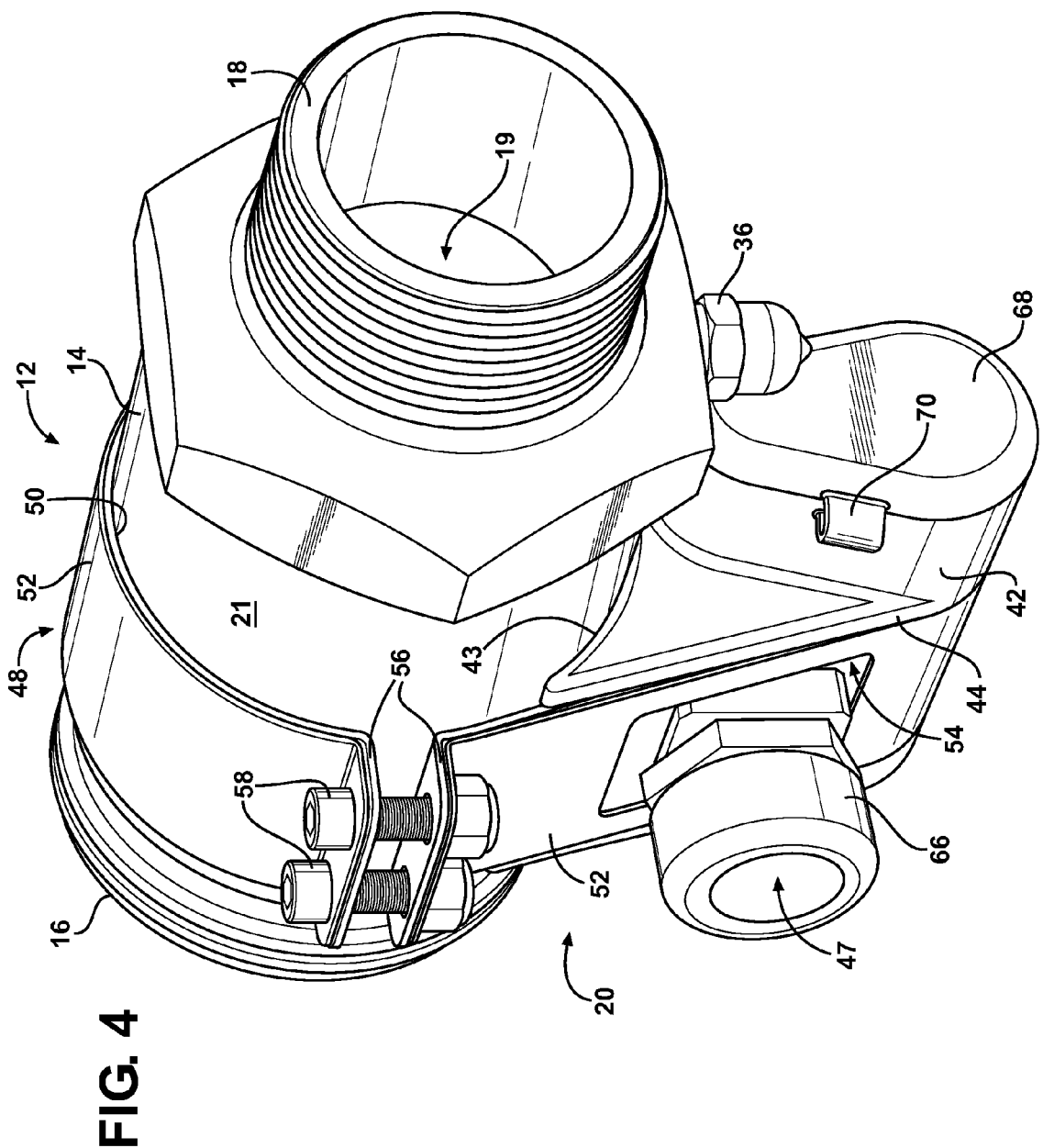
FIG. 4 is a rear perspective view of the coupler component.

Preferably, the sensor housing 42 is formed to mate with at least a portion of the outer surface 21 of the peripheral housing 14 of the coupler component 12. As can be seen in FIG. 4, the sensor housing 42 includes an arcuate base 43 defining a semi-circular surface (not numbered) which abuts the outer surface 21. In other words, the arcuate base 43 is shaped to correspond in shape to a generally cylindrical surface, such as on the coupler component 12. A strap assembly 48 is used for securing the sensor housing 42 to the coupler component 12. More specifically, the strap assembly 48 is disposed about the outer surface 21 of the peripheral housing 14 and the external surface 44 of the sensor housing 42. One advantage of the strap assembly 48 is that no modification to the coupler component 12 is necessary to secure the sensor housing 42 thereto. That is, the strap assembly 48 may be used to retrofit existing coupler components 12 with the sensor 40 without replacement or modification of the coupler component 12. However, it is to be appreciated that the sensor housing 42 can be secured to the coupler component 12 using other methods without departing from the nature of the subject invention.

The strap assembly 48 of the illustrated embodiment has an inner strap 50 and an outer strap 52 such that the inner strap 50 and outer strap 52 cooperate to secure the sensor housing 42 to the coupler component 12. The inner strap 50 is disposed about the outer surface 21 of the peripheral housing 14 for preventing the sensor housing 42 from freely rotating about the outer surface 21 of the peripheral housing 14. It is to be appreciated that the inner strap 50 and the outer strap 52 each may comprise a material such as, but not limited to, a polymer such as an elastomer, a thermoplastic, and blends thereof; a metal and a metal alloy; or any other material known to one skilled in the art suitable for securing the sensor housing 42 to the peripheral housing 14. Preferably, the inner strap 50 comprises an elastomer for providing a friction between the inner strap 50 and the outer surface 21 of the peripheral housing 14, and the outer strap 52 comprises a metal or metal alloy for supporting a weight of the sensor housing 42. The inner strap 50 is partially disposed within a strap passage (not numbered) defined through the sensor housing 42, as best seen in FIG. 5. The outer strap 52 is disposed about the outer surface 21 of the peripheral housing 14 and the external surface 44 of the sensor housing 42. The sensor housing 42 defines a strap groove (not numbered) for cooperating with the outer strap 52. Preferably, the outer strap 52 defines an opening 54, as shown in FIG. 4, having a rectangular configuration for allowing access to the passageway 47.

The outer strap 52 and the inner strap 50 each have a pair of flanged ends 56 spaced apart from each other with at least one bolt 58, preferably two, disposed there between for moving the flanged ends 56 of the outer strap 52 and the inner strap 50 together to prevent the sensor housing 42 from freely rotating about the outer surface 21 of the peripheral housing 14. In another embodiment of the present invention (not shown), the outer strap 52 extends through a portion of the sensor housing 42.

The sensor housing 42 in the illustrated embodiment holds the sensor 40 generally parallel to the coupler component 12. More specifically, the sensor 40 is held generally parallel to a longitudinal axis (not shown) of the peripheral housing 14. As such, the sensor head 41 is generally perpendicular to the longitudinal axis of the peripheral housing 14.

The sensor 40 distinguishes between connection of the cap 38 to the coupler component 12 and connection of the delivery line L to the coupler component 12. That is, the sensor 40 does not mistake connection of the delivery line L to connection of the cap 38.

In the illustrated embodiment, the cap 38 includes a handle portion 59 and a sensing portion 60. The handle portion 59 is generally circularly shaped and includes protrusions and/or indentations (not numbered) to allow the cap 38 to be grasped, thus allowing installation and/or removal from the coupler component 12. The handle portion 59 may also at least partially block the flow of the substance through the inner passage 19 when attached to the coupler component 12. The handle portion 59 defines the internal threads of the cap 38 which mate with the threads of the coupler component 12.

The sensing portion 60 of the cap 38 serves to be detected by the sensor 40 while distinguishing the cap 38 from the delivery line L. The sensing portion 60 is disposed in the outer region when attached to the coupler component 10 such that the sensor 40 senses the sensing portion 60 of the cap 38. In the illustrated embodiment, the sensing portion 60 extends outward from the handle portion 59 and is generally perpendicular to the peripheral housing 14. Furthermore, the sensing portion 60 is disposed in the outer region 20 and preferably extends into an area that is not in-line with or is offset relative to the peripheral housing 14 of the coupler component 10.

The sensing portion 60 of the illustrated embodiment is ring shaped and extends completely around the handle portion 59. As such, the sensing portion 60 can be sensed by the sensor 40 regardless of the rotational position of the cap 38. However, in other embodiments, the sensing portion 60 may be implemented as one or more tabs (not shown) extending from the handle portion 59 of the cap 38.

To aid in distinguishing the cap 38 from the delivery line L, a diameter of the sensing portion 60 of the cap 38 is preferably longer than a diameter of the first end of the peripheral housing. That is, the sensing portion 60 is radially outwardly spaced from the outer surface 21 of the coupler component 12. More preferably, the diameter of the sensing portion 60 is at least 1.25 times longer than the diameter of the peripheral housing at the first end. In the illustrated embodiment, the diameter of the peripheral housing at the first end measures from about 3-4 inches, most preferably about 3.25 inches. An inner diameter of the sensing portion 60 measures about 4-5 inches, most preferably 4 inches, while an outer diameter of the sensing portion 60 measures preferably greater than 4 inches to about 10 inches and most preferably about 8 inches.

Figure 6:
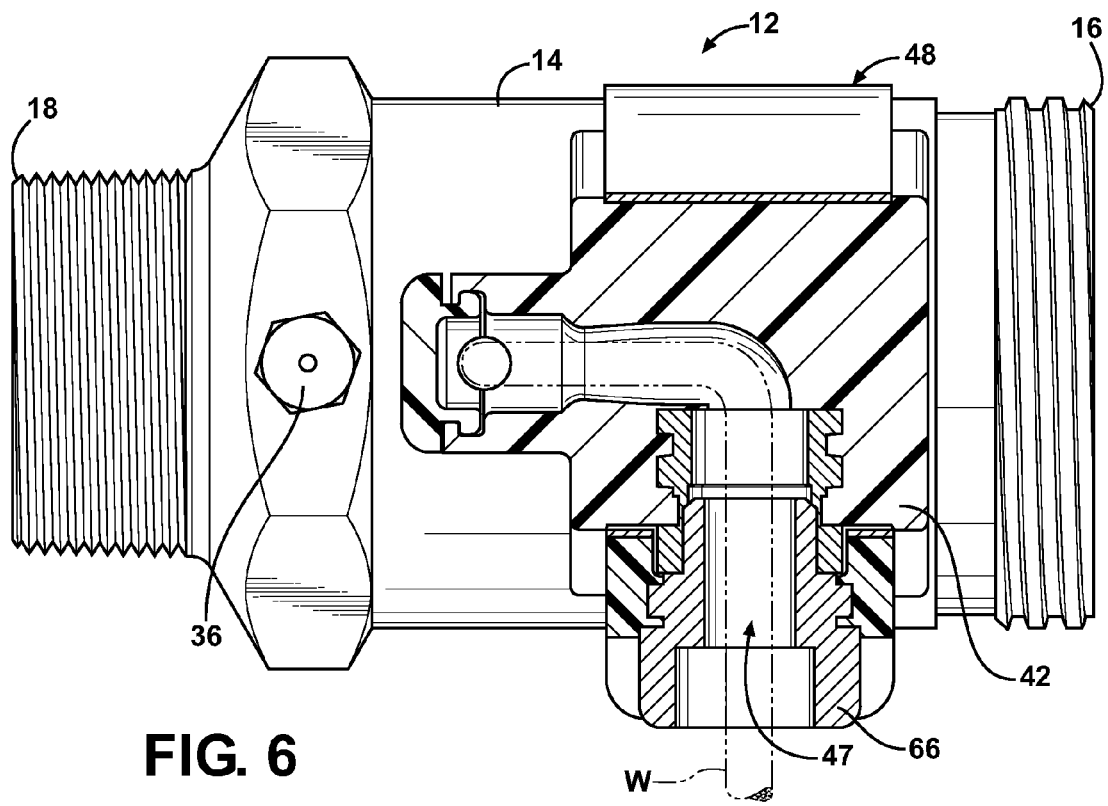
FIG. 6 is a bottom view of the coupler component and a bottom cross-sectional view of the sensor housing.
Figure 7:
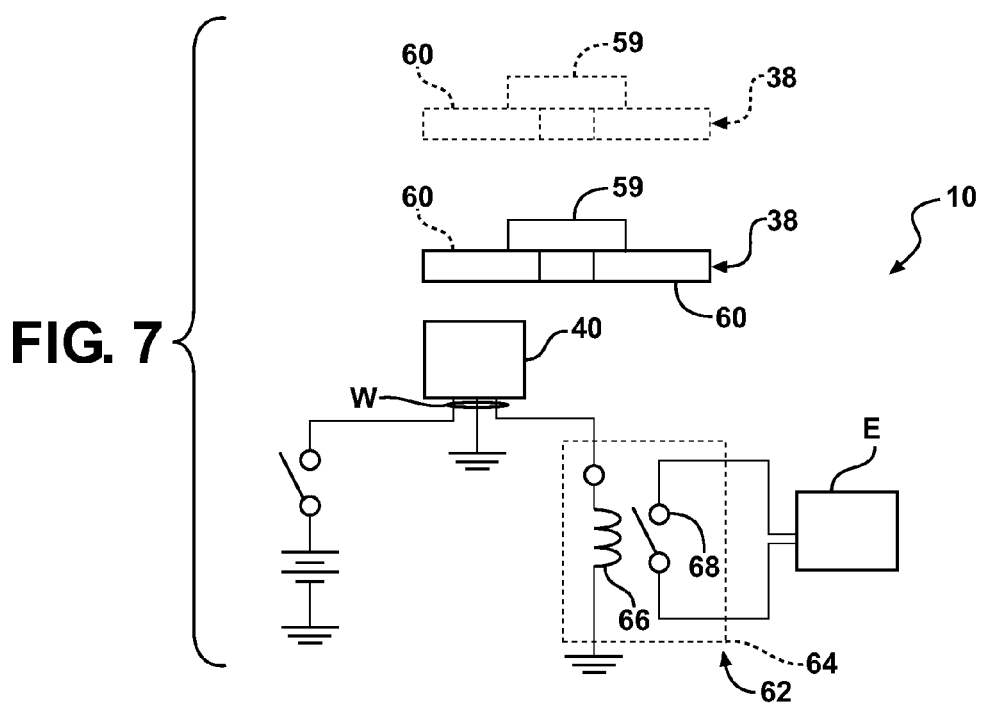
FIG. 7 is a electrical schematic of a system for disabling the vehicle showing the sensor sensing the proximity of the cap and engaging a relay to prevent vehicle movement when the cap is removed.

The system 10 also includes a switch 62 in communication with the sensor 40, as shown in FIG. 6. The switch 62 is connectable to at least one drive element E of the vehicle V to disable at least one drive element E of the vehicle V when the 38 cap is not attached to the coupler component 12.

In the illustrated embodiment, the switch 62 is implemented as an electromechanical relay 64 electrically connected to the sensor 40. Of course, solid state relays, transistors, or other devices may alternatively be utilized to implement the switch 62 as are well known to those skilled in the art. The electromechanical relay 64 of the illustrated embodiment includes a coil 66 and at least one normally open contact 68. When the coil 66 is energized, the normally open contact 68 closes to allow electric current to flow, i.e., provides a logical "1" signal. When the coil 66 is not energized, the contact 68 is open and prevents electric current from flowing, i.e., provides a logical "0" signal. The sensor 40 is electrically connected to the coil 66 to energize the coil when the cap 38 is properly attached to the coupler component 12.

The drive element E of the vehicle V may be any of the mechanisms used to propel the vehicle, including, but not limited to, an engine, a transmission, brakes, a transmission shifting device, an engine controller, and a vehicle controller. In the illustrated embodiment, a normally open contact of the switch 62 is electrically connected to the transmission shifting device. When the switch is open, i.e., when the cap 38 is not properly attached to the coupler component 12, the transmission switching device maintains the transmission in a "park" position in response to the logical "0" signal, and will not allow transfer to any other position or gear (e.g., "drive" or "neutral"). When the switch is closed, i.e., when the cap 38 is properly attached to the coupler component 12, the transmission switching device allows the transmission to be switched to any position in a normal operating fashion in response to the logical "1" signal.

In the illustrated embodiment, the switch 62 is disposed remote from the coupler component 12 and the sensor 40. For instance, the switch 62 may be disposed in an engine compartment (not labeled) of the vehicle V. However, those skilled in the art realize that the switch 62 may alternatively be disposed adjacent to or within the sensor housing 42.

The passageway 47 of the sensor housing 42 extends through the external surface 44 to define an opening (not numbered). A connector 66 is located at this opening. The connector 66 includes one or more seals (not numbered) such that passageway 47 and the inner cavity 46 are sealed to prevent entry of solids, liquids, or gasses into the passageway 47 and inner cavity 46.

The sensor housing 42 also includes a door 68 to allow access to the inner cavity 46. This permits routing of the wire W and connection to the sensor 40 as well as replacement of the sensor 40. The door 68 in the illustrated embodiment is attached to the sensor housing with a retaining leash 70.

In an alternative embodiment, an enclosure (not shown) may be disposed around at least part of the coupler component 12 to enclose and thereby protect the coupler component 12 from the elements. The enclosure includes a door (not shown) which is openable to provide access to the coupler component 12. A door sensor (not shown) senses whether the door is open or not. In one implementation, the door sensor is in communication with the drive element E of the vehicle V to disable the drive element E, in conjunction with the sensor 40 and switch 62. That is, the drive element E is disabled when either the cap 38 is not connected to the coupler component 12 or when the door is open. In another implementation, the door sensor is utilized instead of the sensor 40 such that the drive element E is disabled when the door is open.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for disabling a vehicle carrying a storage tank for holding a substance, said system comprising:
    a coupler component supportable by the vehicle for receiving a connection from a delivery line;
    said coupler component including a peripheral housing having a first end and a second end and defining an inner passage for accommodating the flow of the substance therethrough and separating said inner passage from an outer region;
    a cap attachable to said first end of said coupler component for preventing connection of the delivery line when said cap is attached to said coupler component;
    a sensor for sensing whether said cap is attached to said coupler component without making contact with said cap; and
    a switch in communication with said sensor and connectable to at least one drive element of the vehicle to disable the at least one drive element of the vehicle when said cap is not attached to said coupler component,
    wherein said sensor is configured to distinguish between connection of said cap to said coupler component and connection of the delivery line to said coupler component such that the at least one drive element remains disabled by said switch when the delivery line is connected to said coupler component.

2. A system as set forth in claim 1 wherein said sensor is disposed in said outer region.

3. A system as set forth in claim 2 wherein said cap includes a handle portion for blocking the flow of the substance through said inner passage when attached to said coupler component and a sensing portion disposed in said outer region when attached to said coupler component such that said sensor senses said sensing portion of said cap.

4. A system as set forth in claim 3 wherein said sensing portion of said cap extends from and completely around said handle portion of said cap such that said sensing portion can be sensed by said sensor regardless of a rotational position of said cap.

5. A system as set forth in claim 4 wherein said peripheral housing has a cylindrical shape and said cap has a generally circular shape.

6. A system as set forth in claim 5 wherein said sensing portion is radially outwardly spaced from an outer surface of said coupler component.

7. A system as set forth in claim 3 wherein said sensing portion is generally perpendicular to said peripheral housing.

8. A system as set forth in claim 1 wherein said sensor is encased within a sensor housing.

9. A system as set forth in claim 8 wherein said sensor housing is formed of a non-conductive material.

10. A system as set forth in claim 8 wherein said sensor housing is formed to mate with at least a portion of said peripheral housing of said coupler component.

11. A system as set forth in claim 8 further comprising a strap assembly for securing said sensor housing to said coupler component.

12. A system as set forth in claim 11 wherein said strap assembly includes a first strap and a second strap wherein said first strap extends around said sensor housing and said second strap extends through said sensor housing.

13. A system as set forth in claim 8 wherein said sensor housing defines an inner cavity for accommodating said sensor.

14. A system as set forth in claim 13 wherein said sensor housing defines a door for accessing said inner cavity of said sensor housing.

15. A system for disabling a vehicle carrying a storage tank for holding a substance, said system comprising:
    a coupler component supportable by the vehicle for receiving a connection from a delivery line;
    said coupler component including a peripheral housing having a first end and a second end and defining an inner passage for accommodating the flow of the substance therethrough and separating said inner passage from an outer region;
    said first end of said coupler component configured to receive a cap for preventing connection of the delivery line when the cap is attached to said coupler component;
    a proximity sensor supported by said peripheral housing for sensing whether the cap is attached to said coupler component without making contact with the cap; and
    a switch in communication with said sensor and connectable to at least one drive element of the vehicle to disable the at least one drive element of the vehicle when the cap is not attached to said coupler component,
    wherein said sensor is configured to distinguish between connection of the cap to said coupler component and connection of the delivery line to said coupler component such that the at least one drive element remains disabled by said switch when the delivery line is connected to said coupler component.

16. A method for disabling a vehicle carrying a storage tank for holding a substance, the vehicle having a sensor and a coupler component with at least a first end for receiving connection to a delivery line and accommodating the flow of a substance therethrough, said method comprising the steps of:
    electronically sensing whether a cap is attached to the coupler component without the sensor making contact with the cap; and
    disabling at least one drive element of the vehicle when the cap is not attached to the coupler component,
    wherein said sensing distinguishes between connection of the cap to the coupler component and connection of the delivery line to the coupler component such that the at least one drive element remains disabled when the delivery line is connected to the coupler component.

17. A method as set forth in claim 16 wherein the cap includes a handle portion for blocking the flow of the substance through the coupler component and a sensing portion extending from the handle portion and said sensing whether the cap is attached to the coupler component is further defined as sensing the sensing portion of the cap to determine whether the cap is attached to the coupler component without the sensor making contact with the cap.

18. A system for disabling a vehicle carrying a storage tank for holding a substance, said system comprising:

a coupler component supportable by the vehicle for receiving a connection from a delivery line;

said coupler component including a peripheral housing having a first end and a second end and defining an inner passage for accommodating the flow of the substance therethrough and separating said inner passage from an outer region;

a cap attachable to said first end of said coupler component for preventing connection of the delivery line when said cap is attached to said coupler component;

a sensor housing and a sensor encased within said sensor housing for sensing whether said cap is attached to said coupler component without making contact with said cap;

a strap assembly for securing said sensor housing to said coupler component; and a switch in communication with said sensor and connectable to at least one drive element of the vehicle to disable the at least one drive element of the vehicle when said cap is not attached to said coupler component.

19. A system as set forth in claim 18 wherein said strap assembly includes a first strap and a second strap wherein said first strap extends around said sensor housing and said second strap extends through said sensor housing.

* * * * *